March 15, 1932. F. R. McCRUDDEN 1,849,240
SET SCREW
Filed March 24, 1931
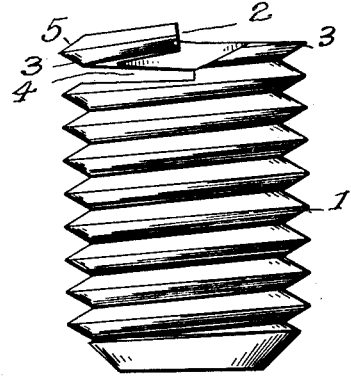
Fig. 1.
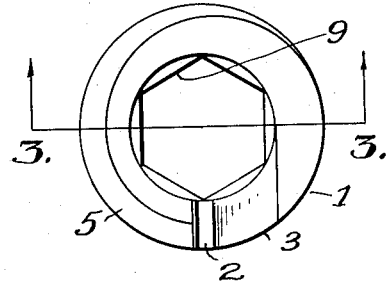
Fig. 2.
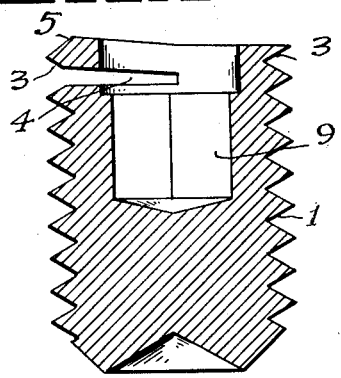
Fig. 3.
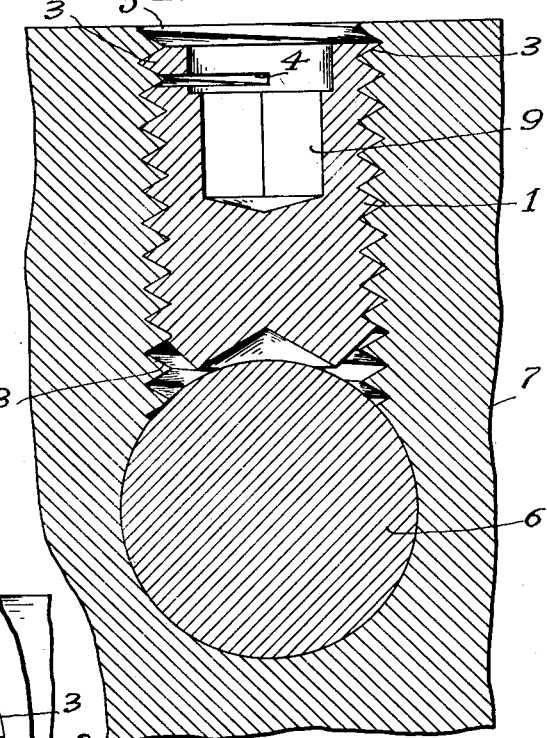
Fig. 5.
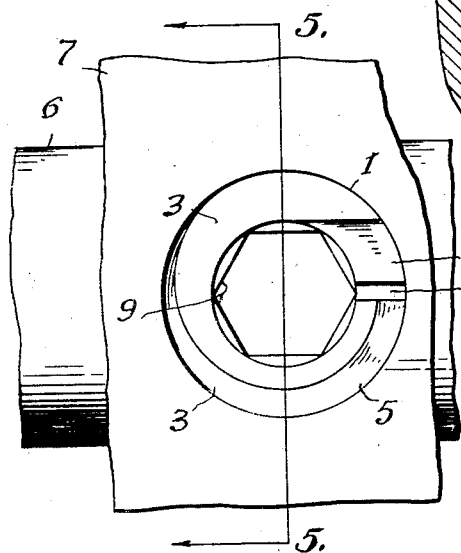
Fig. 4.
Inventor
Frederick R. McCrudden
by
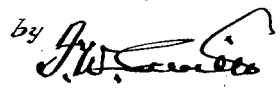
Attorney Patented Mar. 15, 1932

1,849,240

UNITED STATES PATENT OFFICE

FREDERICK R. McCRUDDEN, OF MOORESTOWN, NEW JERSEY, ASSIGNOR TO NATIONAL LOCK WASHER COMPANY, OF NEWARK, NEW JERSEY, A CORPORATION OF NEW JERSEY

SET SCREW

Application filed March 24, 1931. Serial No. 524,829.

My invention relates to set screws but has particular reference to devices of this nature that are self locking as against relaxation from their functions.

The object of the invention is to equip a set screw with a lock washer construction so that the resiliency of such washer will hold such screw as against backing when it is driven home.

In the accompanying drawings which form a part of this description

Figure 1 is an elevation of my improved set screw,

Figure 2 is a top view of the same,

Figure 3 is a section at the line 3—3 of Figure 2,

Figure 4 is a top view of the set screw secured to any suitable object, in the present instance a shaft, and Figure 5 is a section at the line 5—5 of Figure 4.

Similar numerals will be used to denote like parts in the several figures of the drawings.

1 is the body of an ordinary set screw, the head or top portion of which is cut through vertically the thickness of a single thread, as shown at 2, and from this cut portion the upper thread 3 is slitted horizontally throughout a suitable circuit of said thread as at 4 and then raised so as to be at an angle to the succeeding thread throughout this slit portion, the latter and raised portion being in the nature of a helical spring washer 5 that forms a part of the upper thread of the set screw, as will be evident from an inspection of Figures 1 and 3.

A set screw must be driven through one object or machine part against another object or machine part, so as to bind said objects or parts together, and, as the use of set screws is so varied, so far as such objects or parts is concerned, I have elected to illustrate my invention to bind together a shaft or rod 6 and a surrounding part 7, as is shown at Figure 5.

As the set screw is driven within the female thread 8 in the part 7 by means of an ordinary socket wrench applied within the hexagonal or other suitable socket 9 within the top of the set screw, the final driving of said screw will cause the cut and split portion above described that has been raised to form the helical spring washer 5 to engage said female thread and thereby be forced downwardly against the resiliency of said washer, the result being that the latter will exert great pressure against the upper portion of the engaged female thread and this will effectually bind the set screw in its operative position, as will be clear by reference to Figure 5.

I have shown and described a socket wrench-hold in the screw, but it will be obvious that diametrically opposite holes could be made in the upper surface of the screw and a spanner wrench utilized to drive the screw, and therefore the invention is not limited in this respect.

What is claimed is:—

1. A set screw having its top thread portion cut through vertically and slit from said cut portion horizontally throughout a suitable extent, said slit portion being raised to form a helical spring washer construction.

2. A set screw having integral with its top thread a helical spring washer structure, in which the spring washer structure is a part of the top thread.

In testimony whereof I affix my signature hereto.

FREDERICK R. McCRUDDEN.